United States Patent

[11] 3,631,611

[72] Inventor Kendrick M. Abell
 1405 East Revere Road, Fresno, Calif. 93710
[21] Appl. No. 880,802
[22] Filed Nov. 28, 1969
[45] Patented Jan. 4, 1972

[54] TEST SCORING METHOD AND APPARATUS
 10 Claims, 6 Drawing Figs.
[52] U.S. Cl. .................................................. 35/48
[51] Int. Cl. .................................................. G09b 5/00
[50] Field of Search ...................................... 35/9, 48

[56] References Cited
UNITED STATES PATENTS

| | | | |
|---|---|---|---|
| 2,496,767 | 2/1950 | Zuercher.................. | 35/9 |
| 3,148,460 | 9/1964 | Haritonoff................ | 35/48 |
| 3,176,415 | 4/1965 | Leathers.................. | 35/48 |
| 3,209,471 | 10/1965 | Brittan................... | 35/48 |
| 3,284,929 | 11/1966 | Azure, Jr................. | 35/48 |
| 3,412,484 | 11/1968 | Evans et al.............. | 35/48 |

Primary Examiner—Robert W. Michell
Assistant Examiner—J. H. Wolff
Attorney—Vergil L. Gerard ABSTRACT: This disclosure concerns a testing method and apparatus for rapidly scoring of student work papers. The method utilizes a question sheet listing 20 multiple-choice-type questions, an answer sheet, providing fill-in pencil mark blocks for indicating the chosen answer, and an answer code set which contains numerous different codes, each designating which the multiple choice answer to a specific question should be the correct answer. The question sheets are prepared utilizing a particular answer code, by arranging the answers so that the correct answer from the various possible answers provided for each question is the choice specified by the answer code. Detection of the answer code is voided by using different codes from the answer code set. The apparatus has a rotary drum with peripheral code contacts and is movable to a plurality of positions. The answer card is placed in the apparatus and engaged by answer contacts which are so interconnected with the code contacts on the drum as to apply a particular answer code. Comparison of the student answers with the correct answers, for that answer code, is then made electrically utilizing the conductivity of the pencil marks on the answer sheet.

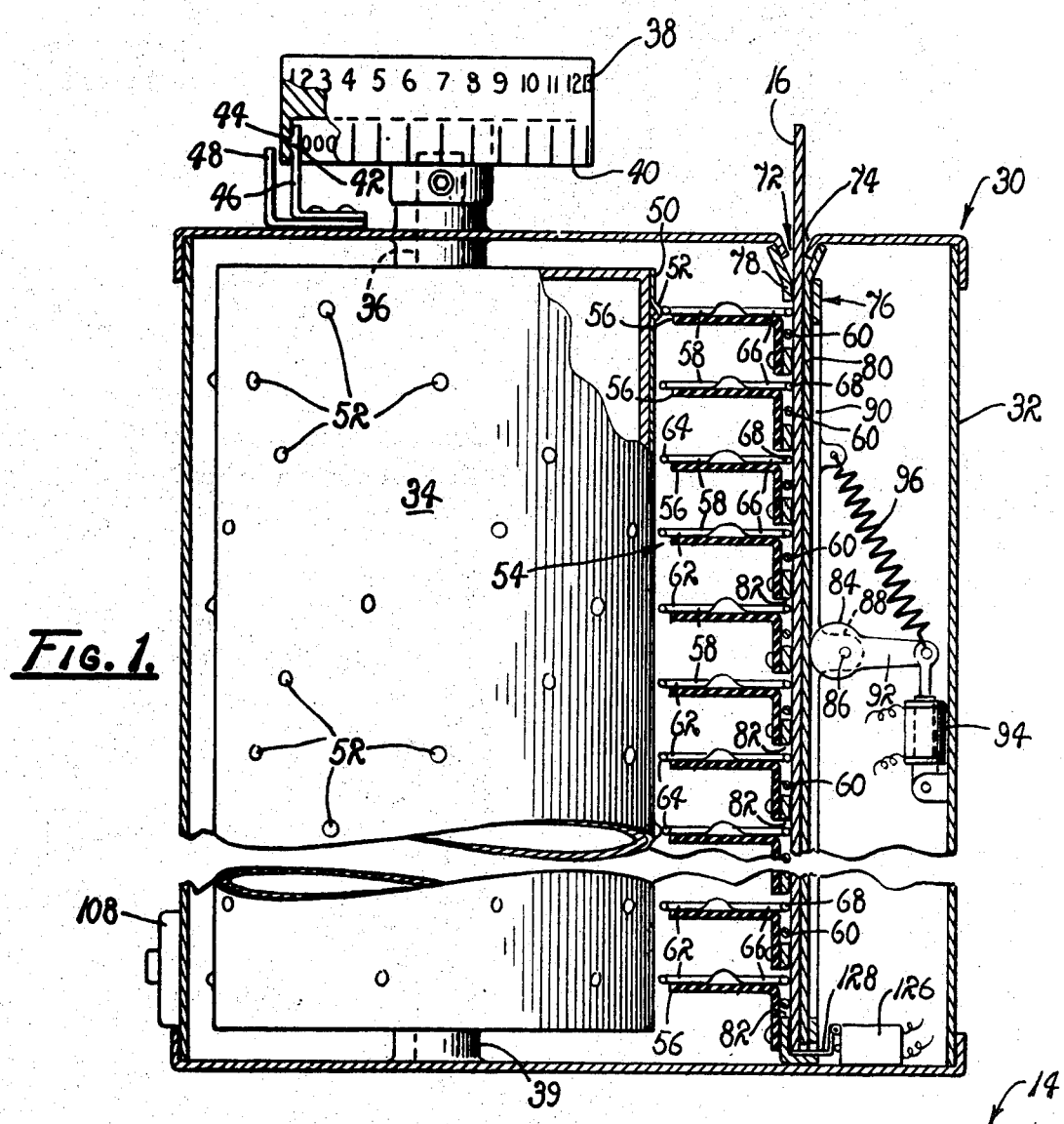

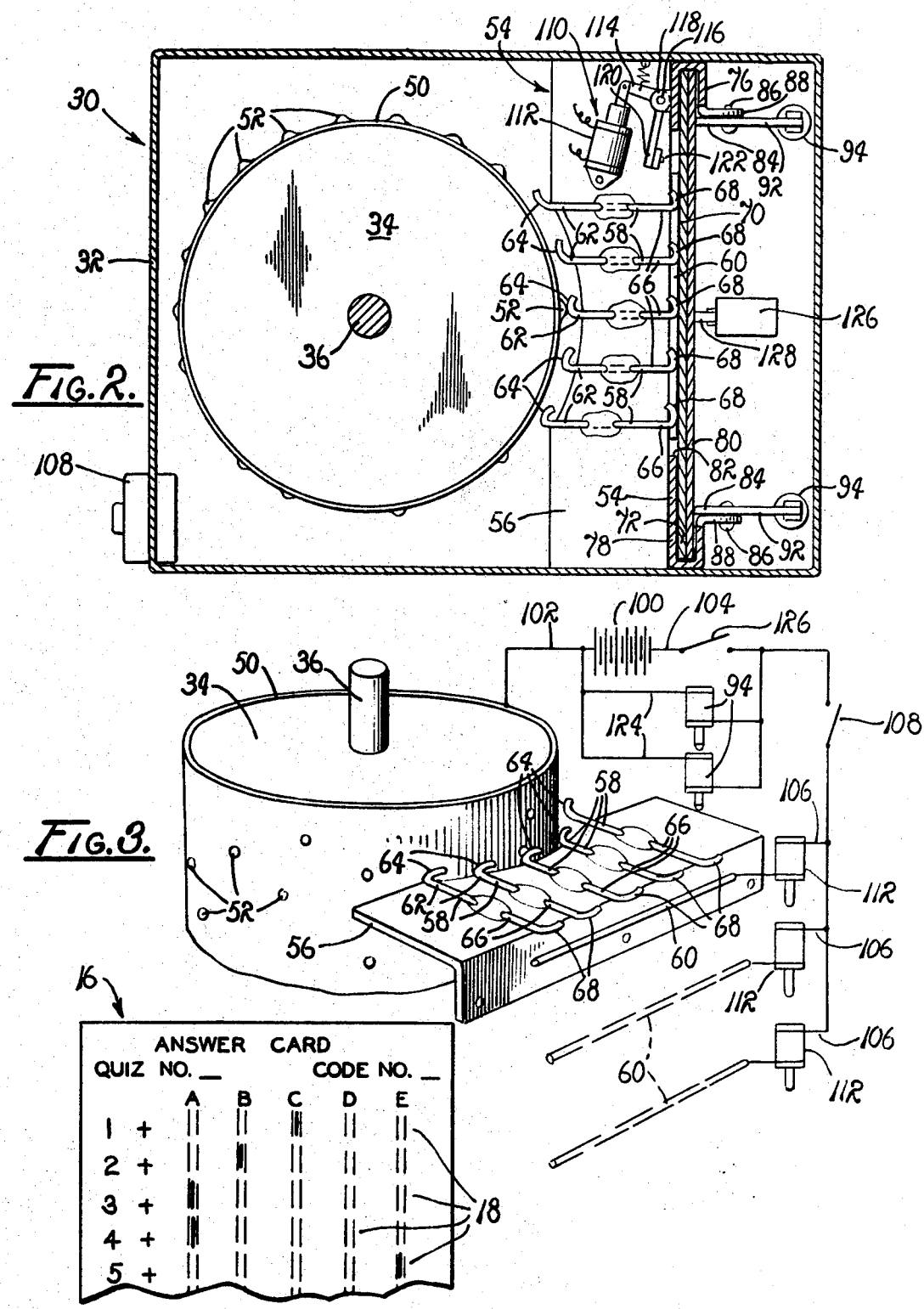

TEST SCORING METHOD AND APPARATUS

This invention relates generally to testing methods and apparatus, and more particularly to methods and apparatus for rapidly scoring work papers of a class of students working at different levels of achievement. Modern education has acknowledged that students learn most rapidly when frequently tested by a system which readily indicates their level knowledge, by directing the attention to the areas of weakness. By such an approach the review of matter already known is minimized, and learning effort is concentrated on matter not known.

Furthermore, modern education seeks to grant more freedom in learning to students by permitting them to progress at their own rate in a subject rather than at the rate of the medium group of a particular class. This is being effectuated by providing students with learning material which they can use themselves and testing materials by which they can determine the progress of their learning.

The utilization of such concepts, together with the increases in student population, and the constantly increasing body of knowledge to be communicated has made the instructor's load increasingly difficult, however. With classes of 30 and more students it is an extremely difficult, if not impossible, task for the instructor to, on the one hand, let students proceed at their own best pace so that they are working at many different levels in the subject matter, while on the other hand, providing them with frequent self-testing devices to test the extent of their learning. A need therefor exists for a method and apparatus which will ease the clerical junctions imposed upon the instructor.

Methods and apparatus have been heretofore suggested which undertake to solve this problem, however, those heretofore conceived have either been too complex and expensive for wide utilization, or too impractical and unwieldy for broad acceptance.

It is therefore a major object of my invention to provide a method and apparatus for rapidly scoring a substantial number of work papers or quizzes covering many different levels of achievement in a particular educational subject matter.

It is another object of my invention to provide a method and apparatus of the type described which assures the integrity of the scoring by satisfactorily avoiding detection of the answer pattern.

It is a further object of my invention to provide a method and apparatus of the type described which is inexpensive to produce and extremely simple to use.

It is still another object of my invention to provide a method and apparatus of the type described which quickly appraises the student of his errors and directs his study to the area of need.

These and other objects and advantages of my invention will become more readily apparent from the following detailed description of a preferred practice of my method and embodiment of my apparatus, illustrated by the accompanying drawings in which:

FIG. 1 is a cross-sectional view of a preferred embodiment of the apparatus of my invention;

FIG. 2 is a cross-sectional plan view of the apparatus of FIG. 1;

FIG. 3 is a partial perspective view of the apparatus of FIG. 1;

FIG. 4 is a partial plan view of an answer card used in practicing the preferred method of my invention;

FIG. 5 is a partial plan view of the answer code set used in practicing the preferred method of my invention; and FIG. 6 is a partial plan view of a question sheet used in practicing the preferred method of my invention.

METHOD

To practice the method of my invention a set of answer codes 10 are first prepared. As illustrated in FIG. 5 the answer code set 10 is made up of 80 individual answer code 12. Each of the answer codes 12 specify, as an answer to each of 20 questions, a letter (i.e. a, b, c, d, or e) corresponding to one of five possible answers. Answer code 3 in FIG. 5 for example, specifies "d" as the correct answer to question 3.

It should be understood, of course, that the number of answer codes 12 which make up the answer code set 10 would be greater or less than 80, that the number of questions covered by each answer code could be more or less than 20, and that the number of possible answers to each question could be more or less than five. Quantities approximating these are preferable, however, because the number of questions is sufficient to cover a reasonable lesson in most educational subject matter, the number of answer does is sufficient to prevent a student from learning the answer pattern, the number of answer choices is sufficient to assure good subject matter coverage, and the apparatus utilized in practicing by method, and later explained in detail, can readily be adapted to such quantities without making it unduly expensive or complex.

Having established the answer code set 10, work papers or question sheets 14 are then prepared to cover lessons in the particular educational subject matter to which the method is being applied. Each of these question sheets 14 has 20 questions, and each question has five possible answers, designated a, b, c, d, and e (see FIG. 6). Each question sheet 14 is prepared to correspond to a particular answer code 12 chosen from the set 10 of the 80 answer codes. The question sheet 14 is so arranged that the correct answer to each question is designated by the latter (i.e., a, b, c, d, or e) which corresponds to the correct answer designated for that question in the particular answer code selected. For example, if answer code 4 is selected for a particular question sheet, the possible answers provided for question 3 will be so arranged that the answer designated (c) is the correct answer. Therefore, after each quiz is prepared the correct answers to all of its questions can be readily ascertained by reference to the answer code upon which it is based. The set of answer codes 10 are not available to the student, of course, but the number of the answer code 12 used in preparation of the question sheet is indicated on the question sheet.

For recording answers to any question sheet, the student is provided with an answer card 16. The answer cards 16 are identical in shape and indicia for all question sheets covering any subject matter. The answer cards 16 have, near the left-hand margin of one face, a vertical listing of Arabic numbers 1 through 20 each representing one of the 20 questions on the question sheet. Opposite each such number and extending horizontally across the answer card face toward the right-hand margin are the letters a, b, c, d, and e, each representing one of the five possible answers offered for each question on the question sheet. Below each of the letters is an answer block 18 defined by two slightly separated vertical parallel lines. The parallel lines have a sufficient length and separation to describe a marking area which when covered with pencil carbon will provide a path of electrical conductivity in a manner well known in the art.

The answer cards 16 also each have at the top the designations "Answer Code" and "Test No." each followed by a blank. In these blanks the student is instructed to inscribe the number of the test he is answering and the answer code number specified on the question sheet.

When the student has completed a question sheet, by making his choice of the five possible answers to each of the 20 questions, and marking this choice on the answer card 16 by filling in the answer block 18 corresponding to his answer choice with his pencil, the answer card is ready for correction. This is achieved by electrically comparing the answers marked by the student on the answer card 16 with the correct answers designated by the answer code 12 upon which the question sheet is based. All answers on the answer card 16 which are correct are marked, but those which are incorrect are not marked. The student is then instructed to ascertain the correct answers to the questions answered incorrectly and repeat the quiz until he achieves a perfect score. Then the student moves on to the next lesson and repeats the process.

APPARATUS

In order to provide means for electrically comparing the answers marked by the student on an answer card 16, with the answers designated by the applicable answer code 12 and marking those answers which are correct, I provide a scoring device 30. The scoring device 30 has a housing 32 in which a drum 34 is mounted for rotation about a vertical axis. The drum 34 is mounted on a shaft 36, the upper end of which extends externally of and is journaled in the top of housing 32, and has a knob 38 mounted thereon to permit manual rotation. The lower end of shaft 36 is mounted in the bottom of the housing 32 by a thrust bearing 39.

The knob 38 has an annular skirt 50 in its lower edge which has a plurality of recesses 42 in its inner surface (See FIG. No. 1). A pawl 44 is mounted on the upper end of a pawl arm 46 which is positioned to place the pawl 44 in engagement with the recesses 42 and is so assembled with the knob 38 as to resiliently bias the pawl into such engagement. The drum 34 is positively positioned by the interaction between the recesses 42 and the pawl 44 in one of 80 possible rotational positions.

A pointer 48 is also mounted on the top of the housing 32 and projects upwardly adjacent the knob 38 on the outside of the skirt 40. Arabic numerals 1-80 are marked on the outer surface of the skirt 40 each corresponding to one of the recesses 42, and are so located that the pointer 48 designates a particular numeral for each rotational position of the drum 34.

The drum 34 is electrically insulated from the housing 32 and has a drum cover 50 of electrical conducting material which carries a plurality of radially protruding code contacts 52. The code contacts 52 are arranged on the drum cover 50 to provide 80 different connection patterns each of which corresponds to one of the answer codes 12 of the answer code set 10, as will be later explained. The drum cover 50 is replacable so that different connection patterns corresponding to a different answer code set can be used if desired.

A panel 54 is mounted in the housing 32 adjacent one segment of the drum 34, which extends over nearly the entire axial length of the drum. The panel 54 carries 20 answer coding banks 56, each of which has five connecting fingers 58 and a bus connector 60. The connecting fingers 58 and bus connector 60 in each answer coding bank are electrically insulated from one another, and from all of the other banks. The connecting fingers 58 are disposed horizontally and extend radially outward from the surface of the drum 34. Each of the connecting fingers 58 has an inner end 62 with a drum contact 64 and an outer end 66 with a card contact 68.

The bus connectors 60 in each of the banks 56 are horizontally disposed adjacent the outer end 66 of the connecting fingers 58 and extend tangentially with respect to the drum 34. Each of the bus connectors 60 is positioned slightly below the outer ends 66 of the connecting fingers in its particular bank and has a card contacting surface 70. The spacing between the card contacts 68 on the outer ends of the connecting fingers 58 and the card contacting surface 70 on the bus connector 60 in each answer code bank is slightly less than the height of the answer block 18 on the answer card 16 so that the pencil carbon in an answer block can form an electrical connection between them when the answer card face is positioned in engagement with the outer portion of the panel 54.

To position the answer card 16 for engagement of its face surface by the connecting fingers 58 and bus connector 60 of the answer coding banks 56, a card slot 72 is formed in the housing 32 in vertical alignment with the axis of drum shaft 36. The card slot 72 has a throat 74 which opens through the top of the housing 32 and card support frame 76 which extends downwardly into the housing 32. The card support frame 76 has a stationary face plate 78 disposed adjacent to the outer portion of the panel 54 and a movable backing plate 80 spaced outwardly from the face plate 78 a distance sufficient to permit insertion of an answer card therebetween.

The stationary face plate 78 has windows 80 extending horizontally across its center portion to provide opening through which the card contacts 68 on the outer ends of the connecting fingers 58, and the card contacting surface 70 on the bus connectors 60 can engage the face of an answer card 16 when it is positioned in the card slot 72 between the face plate 78 and back plate 80.

The back plate 80 is supported in the housing 32 by the card support frame 76 and is movable with respect thereto by means of a drive cam 84 which is mounted on shaft 86 journaled in a pair of ears 88 which project from the outer side of the support frame. The outer surface of the support frame 76 has a center opening 90 which exposes the backing plate 80 to engagement by a pair of the drive cams 84. To drive the cams 84, lever arms 92 are attached to shafts 86 and driven by a pair of solenoids 94 mounted on one wall of the housing 32. The lever arms 92 are so positioned that energizing the solenoids 94 rotates the shafts 86 about one-quarter of a rotation and causes the drive cams 84 to engage the backing plate 80 and move it toward the face plate 78 thereby firmly engaging the face of an answer card 16 in the card slot 72 with the connecting fingers 58 and bus connectors 60 of the answer coding banks 56 on panel 54. When the solenoids 94 are deenergized the lever arms 92 are drawn back to their original positions by return springs 96, rotating the shafts 86 and drive cams 84 in the opposite direction and releasing the pressure on the backing plate 80.

Although, not all of them are shown in the drawings, there are 20 answer coding banks 56 each being so positioned in the panel 54 that they engage one of the answer blocks 18 on the answer card 16. Also, not all 80 positions are shown on the drum cover 44 in the drawings to avoid unnecessary detail.

To provide an electrical circuit for performing the comparison of the answers marked on the answer card 16 with those specified as correct in the applicable answer code 12, a power source 100 is provided. The power source 100 in my preferred embodiment is a low-voltage battery providing DC power, however, by proper adjustment of the circuit elements, hereafter described, it could be an AC source or a DC source provided from a rectified AC power circuit. Low voltage has the advantage of easier switching, lower insulation requirements, and personal safety for the user, and is therefore preferred to higher voltage such as 110 v.

The power source 100 is connected on its first side to the drum cover 50 by power bus 102. Since the drum cover 50 is electrically conductive and insulated from the drum 34, this conveys electrical potential to all of the code contacts 52. Depending upon the rotational position of the drum 34, and the particular answer code 12 set up thereby, this potential is transmitted to certain connecting fingers 58 through contact of the drum contacts 64 on their inner ends 62 with the code contacts 52 on the drum cover.

The second side of the power source 100 is connected by power bus 104 to the bus connectors 60 in each of the answer coding banks 56 in panel 54, by individual bus leads 106. An off-on switch 108 is provided in the lead 104 for manual control of the energizing of the power circuit.

When an answer card 16 is disposed in the card slot 72 and engaged with the card contacts 68 on the outer ends 66 of the connecting fingers of each answer coding bank and the card contacting surface 70 on the bus connectors in each answer coding bank, by movement of backing plate 80 as previously described, a circuit will be completed through each answer coding bank 56 where pencil carbon has been marked in the answer block 18 of the answer card which corresponds to the energized connecting finger 58 of that bank. Since the energized connecting finger in each bank corresponds to the correct answer block for the question to be scored by that bank pursuant to the answer code 12 for which the drum is set, completion of the circuit through any bank indicates the student has answered that question correctly.

To provide means for marking the correct answers made by the student on the answer card 16, a marking device 110 is provided in each answer coding bank. The marking device 110 has a marker solenoid 112 connected in the lead 106 for that particular bank which is energized when the circuit of that bank is completed.

When the marker solenoid 112 is energized it pivots an angle arm 114 pivotally mounted on the card support frame 76 by a pin 116 disposed through a pair of supports 118. The angle arm 114 is positioned so that its distal end 120 extends into the window 82 in the face plate 78 which is associated with that particular answer coding bank. A marker 122 is mounted on the distal end of the angle arm 114 and so positioned that it engages the answer card 16 in its left-hand margin adjacent the Arabic question number when the angle arm is pivoted by the solenoid and marks the answer card "+" at that point (see FIG. No. 4).

The backing plate solenoids 94 which force the backing plate 80 against the answer card 16, are connected across the power source 100 and off-on switch 108 by leads 124.

To keep the power circuit deactivated until the answer card 16 has been completely inserted in the card slot 72 and is ready for scoring, a microswitch 126 is also provided in the power bus 104. The microswitch is located adjacent the bottom of the card slot 72 and is actuated by a trip lever 128 which is disposed in the bottom of the card slot. The trip lever 128 is engaged and actuated by the answer card 16 only after the answer card has been inserted all the way into the card slot 72. The microswitch therefore keeps the power circuit deenergized until the answer card is located in the card slot with the answer blocks 18 properly aligned with the answer coding banks 56.

OPERATION

The operation of my method and apparatus for test scoring is as follows: The instructor provides the class with instructional material in the subject matter which is divided into lessons and permits the students to work at their own rate of learning. Good materials based on this concept are presently on the market and new materials are continuously forthcoming. The instructor prepares quizzes or question sheets 14 for each lesson. The question sheets in my preferred embodiment have 20 questions, each with five possible answers. Often, available materials in the subject matter will already have quizzes at the end of each lesson. If desired, these quizzes can be adapted to use as the question sheets. All the instructor need do to adapt quizzes to my method is to assign a particular answer code 12 from the answer code set 10 to the quiz by arranging the possible answers to each question so that the correct answer bears the letter designation (i.e., a, b, c, d, or e) specified by the answer code. For example, if the instructor chooses answer code 4, the correct answer will be so arranged that the multiple choice answers to question 3 will be designated "c" (see FIG. No. 5). The answer code upon which the question sheet is based is then indicated by number on the top of the question sheet.

Next the instructor distributes answer cards 16 to the students. These answer cards are of proper size, shape and body to fit the card slot 72 of my apparatus and have question numbers 1 through 20 listed vertically down the left-hand margin, with letters a, b, c, d, and e heading five columns across the top of the card (see FIG. 4). Across the answer card opposite each question number, five answer blocks 18 are aligned in each of the columns headed by the letters. Blanks are provided at the top of the answer cards for the student to write in the question sheet number designating the lessor and the answer code number.

The student then answers the questions on the question sheet 14 by marking in the answer block 18 which corresponds to his choice of the possible answer to the question (i.e., a, b, c, d, or e) with pencil carbon. He also, designates the question sheet number and answer code number in blanks at the top of the answer card. When he has marked his answer choices to all of the questions, he takes this answer card to the scoring device for scoring.

To score his answer sheet with the scoring device 30, the student first rotates the knob 38 until the pointer 48 indicates the applicable answer code (e.g. answer code 4). This rotates the shaft 36 and drum 34 carrying the drum cover 50 to a position with respect to the panel 54 where the code contacts 52 on the drum cover make electrical contact with the connecting fingers 58 in each of the answer coding banks 56 representing the correct answers to each question. The scoring device is then set up to score the students choice of answers against the correct answers for the particular answer code. The shaft 36, drum 34 and cover 50 are held in this set up position by engagement of the pawl 44 with the recesses 42 on the inner surface of the knob skirt 40, as previously described.

The student then switches the manual off-on switch 108 to its "on" position, and inserts his answer card 16 into the card slot 72. The answer card 16 is, of course, inserted bottom first into the card slot with the face of the card directed toward the drum 34. When the answer card 16 firmly engages the bottom of the card slot 72 it also engages and actuates the trip lever 128 which closes the microswitch 126 completing the power circuit.

Closing the microswitch 126 energizes the backing plate solenoids 94 which move the backing plate 80 against the back of the answer card 16 through the lever arms 92 and drive cams 84, forcing the face of the answer card into firm engagement with the card contacts 68 on the outer ends of the connecting fingers 58 and the card contacting surfaces 70 on the bus connectors 60. Wherever the energized connecting finger 58 in each answer coding bank contacts an answer block 18 on the face of the answer card 16 which has been marked in by the student, the pencil carbon provides an electrical conductor which passes current to the bus connector 60 in that answer coding bank, since the bus connectors in each answer coding bank contact the lower portion of all of the answer blocks for the question corresponding to that bank. Since the bus connectors 60 are connected to the second side of the power source 100 through individual bus leads 106, and a marker solenoid 112 is connected in each of these leads, current passing through an answer block to the bus connector in any answer coding bank 56 energizes the marker solenoid in that bank and actuates the marker 122 through the angle arm 114 to place a "+" mark on the face of the answer card 16 adjacent the number of the question acted upon by that bank.

Where the energized connecting finger 58 in a particular answer coding bank 56 contacts an answer block 18 which has not been marked in by the student, no current is passed to the bus connector 60 in that answer coding bank, and the marking device 110 for that bank is not energized.

Since each of the answer coding banks 56 of the panel 54 operate individually and simultaneously, my scoring device 30 scores the students answers against the applicable answer code instantaneously. After the student has heard the scoring device energized the marker solenoids 112, he switches the manual off-on switch 108 to "off." This deenergizes the power circuit, including the marker solenoids 112 and the backing plate solenoids 94, and frees the answer card 16 for manual removal from the card slot 72.

The student then reviews the answer card 16 to determine which, if any, questions he did not answer correctly. This he readily determines by noting the questions, if any, which are not marked with correct sign "+" by the marking devices. If any questions were incorrectly answered, the student restudies the applicable subject matter until he determines his error. He then answers the question sheet again on the same answer card and scores this card in the same manner. When the student gets a perfect score on the question sheet pertaining to a particular lesson, he then proceeds to the next lesson and the process is repeated.

Since it is possible to utilize 80 different answer codes 12 without changing the drum cover 50, little, if any, instructor time is required in the scoring of question sheets. Also, if the answer codes are effectively used by the instructor in preparing the question sheets, it is more difficult for the student to break the code than to learn the lesson material and cheating is, therefore, impractical, if not impossible. Furthermore, the device of filling in all the answer blocks 18 for each question on the question sheet is not an effective dodge either, since it would be obvious to the instructor upon a cursory review of the student's answer cards. Though the student might attempt to avoid detection by erasing all but one of the answer blocks for each question after the answer card is scored by the scoring device 30, he will not know the correct answers as the perfect score card indicates, and an instructor upon noting numerous erasure marks needs only check the answer card again to discover the falsification.

Therefore, my method is substantially cheatproof in that it is more work to beat the than to learn the work. Moreover, the method is designed more for lesson checks that for final examination, and when used for the latter, the instructor or his assistant can run the answer cards through the scoring device 30 giving each answer card a cursory inspection for defects.

For this detailed description of my preferred method and apparatus it will be understood that I have provided a very simple and practical aide to an instructor. The method and apparatus not only relieve the instructor of the great burden of correcting numerous lesson papers, but also facilitate the working of students at their own level by permitting the scoring of question sheets pertaining to a variety of lessons without any adjustment by the instructor and at the same time avoiding the progress delay to the student presently caused by grading procedures.

My method and apparatus therefore provided the advantages and achieve the objects heretofore attributed to them, and greatly facilitate learning while paying for themselves by savings in instructors time.

Understanding my invention, it will be obvious that numerous modifications are possible within its scope. The answer blocks on the answer cards for example can be marked magnetically and detected by a magnetically responsive sensor disposed in the circuitry in the place of the card contacting surface on the bus connectors and the card contacts on the connecting fingers. Or, the answer blocks could be punched out and detected by light sensors or contour sensors in the circuitry. Also, the code contacts need not be on a rotatable drum but could be on a linearly movable frame, and, of course, substantial variations in the number of answer codes, questions, and possible answers used is possible.

I claim:

1. A method of test scoring comprising:

first, utilizing a plurality of answer codes each including a plurality of question numbers, with each question number assigned one answer symbol chosen from a predetermined number of answer symbols;

second, utilizing a plurality of question sheets each relating to a particular subject matter, said question sheets each having a plurality of multiple choice-type questions and each of said question sheets being based upon a particular one of said answer codes by having each of said questions identified by a different one of said answer code question numbers and by each of said questions having the possible answers thereto each identified by a different one of said answer symbols and with said possible answers so arranged that the correct answer to each such question is identified by the answer symbol which corresponds to the chosen answer symbol for that particular question number in said particular answer code;

third, utilizing answer cards and having a plurality of question numbers thereon each corresponding to the question numbers utilized in said answer codes, with each of said question numbers having associated therewith a plurality of answer blocks each identified by a different one of said answer symbols utilized in said answer codes;

fourth, having students indicate their answer choice to each question on a particular one of said question sheets by marking on one of said answer cards one of the answer blocks associated with the question number on said answer card which corresponds to the question number of the question on said question sheet being answered;

fifth, simultaneously altering a plurality of electrical circuits, each corresponding to a particular one of the question numbers in said answer codes, for response to a particular one of said answer codes by so connecting each such circuit that it is energized by the answer block marking on an answer card for the particular question number to which said circuit corresponds when the answer block marked is identified by the chosen answer symbol for that particular question number in the particular answer code for which said circuits are made responsive; and sixth, electrically comparing, by means of said electrical circuits, said marked answer blocks for each question number on a particular answer card with said chosen answer in said particular answer code to which said electrical circuits have been made responsive.

2. A method for test scoring as described in claim 1 in which:

said fourth step further includes having students mark their answer choice on said corresponding answer blocks on said answer cards by filling them in with pencil carbon; and said sixth step further includes comparing said marked answer blocks on said answer card with said chosen answer in said applicable answer code by means of said electrical circuits by electrically interconnecting said answer blocks into said circuits by utilizing the electrical conductivity of answer blocks filled in with pencil carbon.

3. A method of test scoring as described in claim 1 in which:

said first step includes a number of answer codes greater than five, each including a number of questions greater than five, each assigned one answer symbol chosen from a predetermined number of answer symbols greater than one; and said second step includes question sheets having a number of questions not more than the number of question numbers in the answer code upon which said question sheet is based.

4. A method for test scoring as described in claim 1 in which:

said fifth step further includes connecting into a master electrical circuit a plurality of subcircuits each corresponding to a particular one of the question numbers in said answer codes, and each connected for response to a particular answer code, said subcircuits being each disposed to conduct electricity when the answer block marked on an answer card for the particular question number to which said particular subcircuit corresponds is identified by the chosen answer symbol for that particular question number in the answer code to which said subcircuits are made responsive, and each of said subcircuits having indicator means which are actuated upon electrical conductivity therein; and said sixth step further includes electrically inserting into each of said subcircuits said marked answer blocks on said answer card.

5. A method for test scoring as described in claim 1 in which:

said first step further includes a set of 10 or more answer codes each having 10 or more question numbers with each having a particular answer symbol chosen from a predetermined number of answer symbols greater than two;

said second step further includes utilizing a question sheet prepared to correspond with a particular one of said answer codes by having a number of multiple choice-type questions not greater than the number of question numbers in said particular answer code with each of said questions identified by a separate one of said question numbers, and with each of said questions having a number of possible answers not greater than the number of answer symbols in said particular answer code with each of said answers being identified by a separate one of said answer symbols and the correct answer to each of said questions identified by the chosen answer symbol for the corresponding question number in said particular answer code;

said fifth step further includes connecting into a master electrical circuit a plurality of subcircuits each corresponding to a particular one of the question numbers in said answer codes, and each connected for response to a particular answer code, said subcircuits being each disposed to conduct electricity when the answer block marked on an answer card for the particular question number to which said particular subcircuit corresponds is identified by the chosen answer symbol for that particular question in the answer code to which said subcircuits are made responsive, and each of said subcircuits having indicator means which are actuated upon electrical conductivity therein; and said sixth step further includes electrically inserting into each of said subcircuits said marked answer blocks on said answer card.

6. A method for test scoring as described in claim 1 in which:

said fourth step further includes having students mark their answer choice on said corresponding answer blocks on said answer cards by filling them in with pencil carbon;

said fifth step further includes connecting into a master electrical circuit a plurality of subcircuits each corresponding to a particular one of the question numbers in said answer codes, and each connected for response to a particular answer code, said subcircuits being each disposed to conduct electricity when the answer block marked on an answer card for the particular question number to which said particular subcircuit corresponds is identified by the chosen answer symbol for that particular question number in the answer code to which said subcircuits are made responsive, and each of said subcircuits having indicator means which are actuated upon electrical conductivity therein; and said sixth step further includes comparing said marked answer blocks on said answer card with said chosen answer in said applicable answer code by means of said electrical circuits by electrically interconnecting said answer blocks into said subcircuits by utilizing the electrical conductivity of answer blocks filled in with pencil carbon.

7. A scoring device for electrically comparing answers to a plurality of multiple choice-type questions marked by a student on an answer card with correct answers to said questions as designated by a predetermined answer code, comprising:

an electrical master circuit having an electrical power source and electrical circuit conductors;

a plurality of electrical subcircuits each interconnected with said master circuit, and each disposed to correspond to a particular one of said questions;

said subcircuits each having a plurality of switching circuits each disposed to correspond to a separate one of the possible answers to the particular question to which said subcircuit corresponds;

answer code input means operatively associated with each of said subcircuits and interconnected with each of said switching circuits, said answer code input means being operable to selectively connect a particular one of the switching circuits in each of said subcircuits to a first side of said power source as designated by said predetermined answer code so as to simultaneously alter said answer code;

student answer input means operatively associated with said subcircuits, said student answer input means having a plurality of sensing means, each interconnected with a different one of said switching circuits and disposed to connect said switching circuits in each of said subcircuits to a second side of said power source upon sensing an answer marking on said answer card; and indicating means operatively associated with said master circuit and having a plurality of electrical indicators each interconnected with a separate one of said subcircuits, said indicators being disposed for actuation upon the conduction of electricity through its particular subcircuit.

8. A scoring device as described in claim 7 in which:

said switching circuits in each of subcircuits include connecting fingers having a code contact end and an answer mark contact end;

said answer code input means includes a plurality of code contacts all interconnected with a first side of said power source, said code contacts being movably mounted with respect to said connecting fingers and disposed to selectively connect with the code contact end of one connecting finger in each subcircuit; and student answer input means has each of said sensing means interconnected between a second side of said power source and the answer mark contact end of a different one of said connecting fingers.

9. A scoring device as described in claim 7 in which:

said electrical master circuit is contained in a housing;

said electrical subcircuits are mounted in a panel of circuits in said housing with each subcircuit constituting a bank of said panel, and said switching circuits each have a connecting finger having a code contact end and an answer mark contact end;

said answer code input means includes a manually rotatable drum mounted in said housing adjacent said panel, said drum having code contacts on the periphery thereof interconnected with a first side of said power source and disposed to selectively engage the code contact end of one of said connecting fingers in each of said subcircuits;

said student answer input means has sensing means which include a bus disposed adjacent the answer mark contact ends of each of the connecting fingers in a particular subcircuit and answer mark contacts on the answer mark contact end of each of said connecting fingers disposed in closely spaced relationship with said answer mark contact bus in the same subcircuit as said connecting fingers but spaced apart a distance equal to an answer mark on said answer card, said answer mark contacts being disposed for electrical connection to said answer mark contacting bus in each of said subcircuits upon engagement with answer marks on said answer card through said pencil carbon disposed on said answer card as an answer mark.

10. A scoring device as described in claim 9 in which:

said student answer input means further include an answer card receptacle mounted in said housing adjacent said panel of circuits and disposed to receive an answer card, said receptacle having openings disposed to expose the answer marks on an answer card disposed therein to engagement by said answer mark contact ends of said connecting fingers and said answer mark contact bus in each of said subcircuits, and an electrically actuatable positioning means disposed to position said answer card, upon actuation, into said position of engagement of said answer marks by said answer mark contact ends and said answer mark buses.

* * * * *